(No Model.)
T. P. HARDY.
PIPE COUPLING.
No. 282,312.  Patented July 31, 1883.
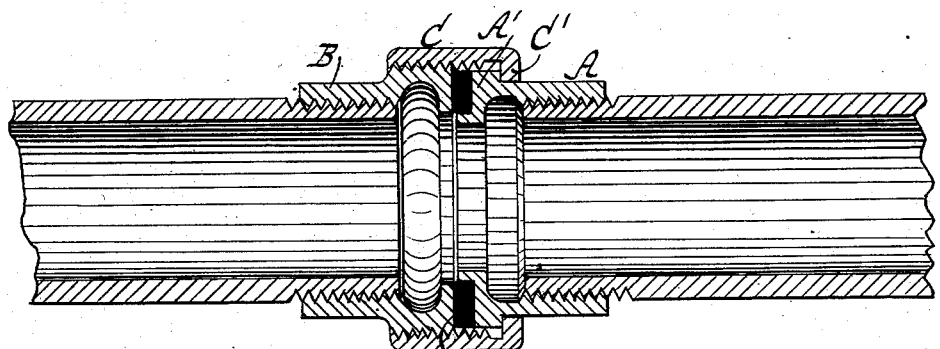
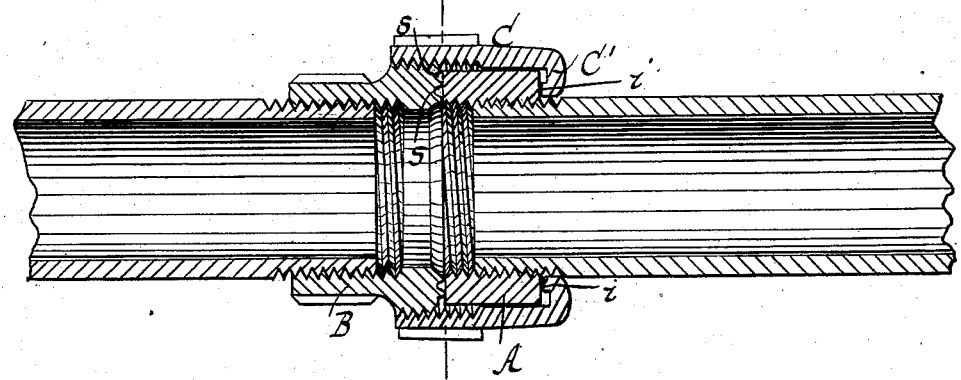
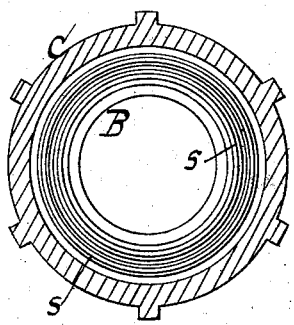
WITNESSES:
William Miller
Otto Hufeland
INVENTOR
Thomas P Hardy
BY Van Santvoord & Hauff
ATTORNEYS

UNITED STATES PATENT OFFICE.

THOMAS P. HARDY, OF NEW YORK, N. Y.

PIPE-COUPLING.

SPECIFICATION forming part of Letters Patent No. 282,312, dated July 31, 1883.

Application filed February 27, 1883. (No model.)

*To all whom it may concern:*

Be it known that I, THOMAS P. HARDY, a citizen of the United States, residing at New York, in the county and State of New York, have invented new and useful Improvements in Pipe-Couplings, of which the following is a specification.

This invention relates to the construction of couplings or unions for pipes, and especially that class thereof which are composed of two pipe ends or rings, commonly termed a "small end" and a "large end," and of a flanged nut which engages the small end by means of its flange, and screws onto the large end to bring the ends together.

The novel features of my coupling are hereinafter fully described, and illustrated in the accompanying drawings, in which—

Figure 1 shows an old form of coupling in longitudinal section. Fig. 2 shows the new coupling, also in longitudinal section. Fig. 3 is a cross-section thereof, taken on the line $x\,x$, Fig. 2.

Similar letters indicate corresponding parts.

The letter A designates the small, and B the large, rings, each having an internal screw-thread whereby it is attached to the ring of a pipe, the large ring having also an external thread to engage with the nut.

C indicates the screw-nut, having a flange, C', at one end, its thread extending inward from the other end.

Prior to my invention the flange C' was left plain on the inner side, as shown in Fig. 1, and it was necessary to face the whole of such side in order to produce the required joint between the flange and small ring. In performing this operation the tool is exposed to excessive wear at the point where it comes in contact with the corner formed at the junction of the flange with the side of the nut, and hence it is necessary to grind or renew the tool at frequent intervals. To overcome the objection thus created I provide the flange C' with a rib or projection, $i$, Fig. 2, on the edge of its inner side, to bear against the small ring A, so that this rib is the only part needing to be faced, and the tool is kept entirely out of the corner mentioned.

In the old coupling the flange C' was made to catch over a shoulder, A', on the inner edge of the small ring, whereas in my device the flange catches over the outer edge of the ring, so as to bring the latter entirely within the nut, and an important advantage thereby gained is that the width of the flange can be increased without comparatively increasing the size of the nut, because the diameter of the nut-opening at the flange may correspond to the pipe, instead of the small ring, the pipe being the only part to go through the opening.

It has been customary heretofore to interpose a packing-ring, D, between the adjacent edges of the rings A B. This packing-ring I have dispensed with, and in lieu thereof I provide one of the ends with one or more ridges, $s$, on the inner or bearing edge, which are angular in cross-section and concentric in position, and the corresponding edge of the other end being left plain, such ridges grind tightly upon it when the parts are put together. In the example shown the ridges $s$ are on the large end.

What I claim as new, and desire to secure by Letters Patent, is—

1. The combination, substantially as hereinbefore described, with the rings A B, of the nut C, having a flange which is provided with a rib or projection on the edge of its inner side, for the purpose specified.

2. The combination, in a pipe-coupling, of the two rings interiorly threaded to connect with the pipes, the face of one ring being formed smooth and plane and the face of the other having a series of concentric angular ridges, with a screw-threaded nut, C, for drawing the rings together and connecting them in such manner that by the union of the parts the ridges of one ring grind tightly on the plane-faced end of the other, substantially as described.

In testimony whereof I have hereunto set my hand and seal in the presence of two subscribing witnesses.

THOS. P. HARDY. [L. S.]

Witnesses:
W. HAUFF,
CHAS. WAHLERS.